Nov. 17, 1936.  H. W. DENHARD  2,061,351

FILTER LEAF

Filed Jan. 4, 1935

INVENTOR.
HARRY W. DENHARD.
BY
ATTORNEY

Patented Nov. 17, 1936

2,061,351

UNITED STATES PATENT OFFICE 2,061,351

FILTER LEAF

Harry W. Denhard, Oakland, Calif., assignor to Oliver United Filters Incorporated, San Francisco, Calif., a corporation of Nevada Application January 4, 1935, Serial No. 390

3 Claims. (Cl. 210—195)

This invention relates to filter leaves and in particular to filter leaves adapted to be used for the filtration of food products, such as milk.

In designing filtration equipment adapted for use in the filtration of food products care must be taken not only to obtain the desired clarity and capacity, but also to produce a filter which may be readily disassembled, washed and sterilized.

In general the object of this invention is the provision of a filter leaf comprising a pair of panels of filter medium separated by a drainage screen and accommodated within a U-shaped frame and which can be readily disassembled to thereby permit a thorough washing and sterilization of its component parts.

The invention possesses other advantageous features, some of which with the foregoing, will be set forth at length in the following description where that form of the invention which has been selected for illustration in the drawing accompanying and forming a part of the present specification is outlined in full. In said drawing, one form of the invention is shown, but it is to be understood that it is not limited to such form, since the invention as set forth in the claims may be embodied in a plurality of forms.

Referring to the drawing.

Figure 1:
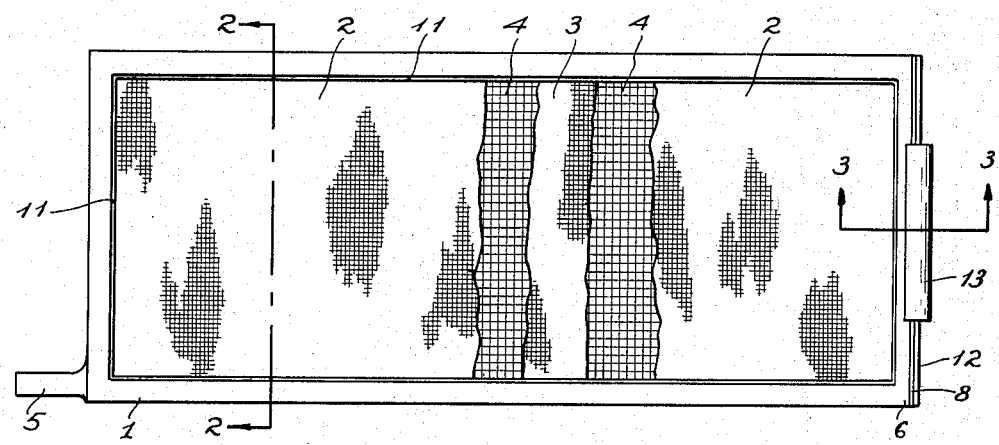
Figure 1 is a side elevation of a filter leaf embodying the object of the invention.
Figure 2:
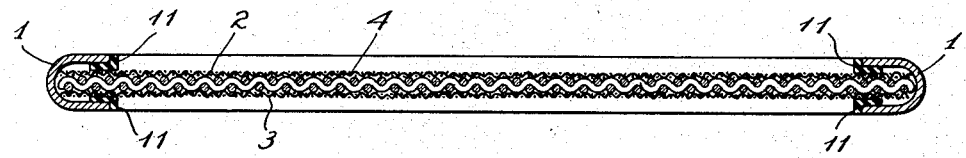
Figure 2 is a cross section taken on the line 2—2 of Figure 1.
Figure 3:
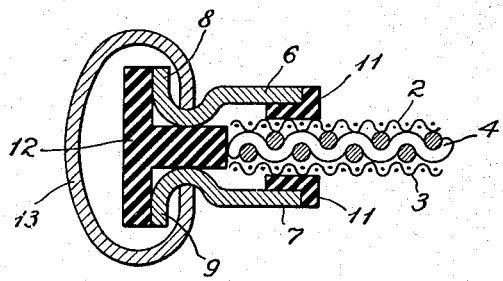
Figure 3 is a cross section taken on the line 3—3 of Figure 1.

The invention contemplates the use of a closed frame of any desired shape, but preferably rectangular as shown in Figure 1, and of U-shape in cross section as shown in Figure 2. Disposed within the frame 1 is a pair of panels of filter medium 2 and 3 separated by a drainage screen 4. One end of the frame 1 is provided with a filtrated outlet 5 while the opposite end is formed by a pair of spaced side members, bars or strips 6 and 7 provided at their outer ends with outwardly directed flanges 8 and 9, as shown in Figure 3. These flanges define a slot extending the full width of the frame 1, and are of such dimensions that the panels of filter medium 2 and 3 and the drainage screen 4 may be readily passed through it for the purpose of assembling and disassembling the leaves. Disposed around the inner periphery of each side of the frame 1 are L-shaped strips or gaskets 11 as shown in Figures 2 and 3. These gaskets are frictionally engaged between the outer faces of the panels of filter medium 2 and 3 and the inner faces of the U-shaped frame 1 and the strips 6 and 7. The flanges or feet of the L-shaped gaskets 11 abut against the edges of the U-shaped frame, and the strips or bars 6 and 7. It will therefore be seen that when the strips 11 are in their operative position there is no ingress to the drainage screen 4 except through the panels of filter mediums 2 and 3. Preferably separate gaskets are made for each of the sides and ends of the frame but if desired each face of the leaf may be provided with a single closed gasket of rectangular form. The slot defined by the outer flanged edges of the space bars or strips 6 and 7 may be conveniently closed by means of a T-shaped seal or gasket 12, the leg of which extends into the slot while its cross member rests on the flanges 8 and 9. The outer flanged edges of the bar or strips 6 and 7 are held in frictional engagement with the intervening leg of the gasket 12, by means of a split tube 13 adapted to be passed over the flanges 8 and 9. The tube 13 has a spring action on the outer faces of the bars 6 and 7 which tends to hold them in engagement with the depending leg of the gasket 12.

To disassemble the filter leaf as above described, it is only necessary to remove the split tube 13, the gaskets 11 and 12 and then slide the panels of filter mediums 2 and 3 and the drainage screen 4 through the slot formed by the bars 6 and 7. Each of these elements may be readily washed and sterilized, for it is to be noted that they present no hidden or inaccessible areas. The interior of the U-shaped frame 1 is readily accessible for the mouth of the U is in no way restricted. The remaining elements are all of simple straight line design and therefore also involve no problem as far as washing and sterilizing are concerned. Furthermore, it is to be noted that a leaf as above constructed may be readily assembled and disassembled.

The same general principles may be embodied in a circular leaf by utilizing two hinged, semi-circular frames U-shaped in cross-section in conjunction with an annular rubber gasket for each face of the leaf.

I claim:

1. A filter leaf comprising a frame U-shaped in cross section and provided with a slot at one end and with a filtrate outlet somewhere along its periphery; a pair of panels of filter medium separated by a drainage screen accommodated in said frame and slidable through said slot; gaskets frictionally engaged between the filter panels and the frame, and means for closing said slot.

2. A filter leaf comprising a closed rectangular frame U-shaped in cross section and provided at one end with a slot and at its opposite end with a filtrate outlet; a pair of panels of filter medium separated by a drainage screen accommodated in said frame and slidable through said slot; flanged gaskets frictionally engaged between said panels and the frame with their flanges abutting the inner peripheral edges of the frame; and means for sealing said slot.

3. A filter leaf comprising a frame of U shape in cross section and provided at one end with a pair of spaced side members having outwardly directed flanges defining a slot and at its opposite end with a filtrate outlet; a pair of panels of filter medium separated by a drainage screen accommodated in said frame and slidable through said slot; gaskets frictionally engaged between said panels and the frame; a T shaped gasket disposed in said slot with its cross bar resting on said flanges; and a clamp for gripping said side members against the T shaped gasket.

HARRY W. DENHARD.